US010648848B2

(12) United States Patent
Hirose et al.

(10) Patent No.: US 10,648,848 B2
(45) Date of Patent: May 12, 2020

(54) MOUNTING STRUCTURE OF LIQUID LEVEL DETECTING DEVICE

(71) Applicant: Yazaki Corporation, Tokyo (JP)

(72) Inventors: Ryo Hirose, Makinohara (JP); Shintaro Nakajima, Makinohara (JP); Shinpei Kato, Makinohara (JP); Shingo Nomoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 234 days.

(21) Appl. No.: 15/997,007

(22) Filed: Jun. 4, 2018

(65) Prior Publication Data

US 2018/0348044 A1    Dec. 6, 2018

(30) Foreign Application Priority Data

Jun. 5, 2017 (JP) .................................. 2017-111088
Mar. 13, 2018 (JP) .................................. 2018-045753

(51) Int. Cl.
| | | |
|---|---|---|
| *G01F 23/38* | (2006.01) | |
| *G01F 23/36* | (2006.01) | |
| *F02M 37/00* | (2006.01) | |
| *F16M 13/02* | (2006.01) | |
| *B60K 15/03* | (2006.01) | |

(52) U.S. Cl.
CPC .......... *G01F 23/38* (2013.01); *F02M 37/0082* (2013.01); *G01F 23/36* (2013.01); *B60K 2015/03217* (2013.01); *F16M 13/02* (2013.01)

(58) Field of Classification Search
CPC .......... G01F 23/30; G01F 23/32; G01F 23/34; G01F 23/36; G01F 23/38; G01F 23/56; G01F 23/64; B60K 2015/03217; F16M 13/02
USPC ........................... 73/305, 309, 313, 314, 317
See application file for complete search history.

(56) References Cited

U.S. PATENT DOCUMENTS

| | | | | |
|---|---|---|---|---|
| 5,341,679 A | * | 8/1994 | Walkowski ............. | G01F 23/36 73/313 |
| 2015/0377688 A1 | * | 12/2015 | Fukuhara ................ | G01F 23/38 73/313 |

FOREIGN PATENT DOCUMENTS

| | | |
|---|---|---|
| JP | 4591360 B2 | 12/2010 |
| JP | 5293865 B2 | 9/2013 |

* cited by examiner

*Primary Examiner* — Benjamin R Schmitt
(74) *Attorney, Agent, or Firm* — Sughrue Mion, PLLC

(57) ABSTRACT

A mounting structure includes a mounting object member and a liquid level detecting device. The liquid level detecting device includes a device main body which is mounted on a mounting surface of the mounting object member and a holder which is attached to the device main body and is rotated according to a variation of a liquid level of liquid stored in a tank. The mounting object member has a pair of lock portions which lock side portions of the device main body respectively and a pair of projections. The device main body has a pair of hooks. The hooks have respective claws. The hooks are formed closer to the mounting surface in a thickness direction of the device main body than a holder movable area of the device main body.

6 Claims, 13 Drawing Sheets

MOUNTING STRUCTURE OF LIQUID LEVEL DETECTING DEVICE

CROSS REFERENCE TO RELATED APPLICATIONS

This application is based on Japanese Patent Application (No. 2017-111088) filed on Jun. 5, 2017 and Japanese Patent Application (No. 2018-045753) filed on Mar. 13, 2018, the contents of which are incorporated herein by reference.

BACKGROUND OF THE INVENTION

1. Field of the Invention

The present invention relates to a mounting structure of a liquid level detecting device.

2. Description of the Related Art

Among devices for detecting a level of a liquid stored in a tank are ones in which a device main body is held from both sides by inserting the device main body between a pair of stoppers that are formed in a tank holder and is prevented from coming off the stoppers by locking, from outside, claws of a pair of hooks formed in the tank holder on projections that project as two respective side portions of the device main body (refer to JP-B-4591360, for example).

Devices of another type are known in which a device main body is prevented from coming off stoppers by hooking a tank-holder-side hook portion capable of elastic deformation on a hook target portion that is formed inside in the width direction of the device main body (refer to JP-B-5293865, for example).

However, in the mounting structure disclosed in JP-B-4591360, since the claws of the tank-holder-side hooks are locked, from outside the device main body, on the respective projections formed as the two respective side portions of the device main body, the width of the entire mounting object member is made large.

On the other hand, in the mounting structure disclosed in JP-B-5293865, the width of the mounting object member is not made large because the tank-holder-side hook portion is hooked on the hook target portion that is formed inside in the width direction of the device main body. However, in this mounting structure, a gap is formed between the mounting surface and the hook portion of the tank holder. As a result, there may occur an event that a finger, a tool, or the like goes into the gap and is hooked on the hook portion to cancel the lock state unintentionally. In addition, the device main body in which the hook target portion (on which the hook portion is to be hooked) extends is made long in its longitudinal direction.

SUMMARY OF THE INVENTION

The present invention has been made in view of the above circumstances, and an object of the invention is therefore to provide a liquid level detecting device mounting structure that allows a main body of the liquid level detecting device to be kept attached to a mounting object member reliably while enabling miniaturization of the liquid level detecting device.

To attain the above object, the invention provides liquid level detecting devices of the following items (1) to (5):

(1) A mounting structure of a liquid level detecting device for detecting a liquid level of liquid stored in a tank, the mounting structure comprising:
a mounting object member; and
the liquid level detecting device including:
a device main body which is mounted on a mounting surface of the mounting object member; and
a holder which is attached to the device main body and is rotated according to a variation of the liquid level of the liquid stored in the tank;
wherein the mounting object member has a pair of lock portions which lock respective side portions of the device main body when the device main body is inserted between the lock portions and a pair of projections which are formed so as to face a front portion of the device main body when the device main body is inserted between the lock portions;
wherein the device main body has a pair of hooks which are arranged in a width direction of the device main body and extend in an insertion direction where the device main body is inserted between the lock portions;
wherein the hooks have respective claws which are locked on the respective projections from inside in the width direction of the device main body; and
wherein the hooks are formed closer to the mounting surface in a thickness direction of the device main body than a holder movable area of the device main body For example, the hooks are formed between the mounting surface and the holder movable area of the device main body in the thickness direction of the device main body, and the thickness direction is perpendicular to both of the width direction of the device main body and the insertion direction.

(2) The mounting structure of the liquid level detecting device according to item (1), wherein the device main body has lateral deformation restriction portions which come into contact with the respective hooks when the hooks are deformed inward in the width direction of the device main body.

(3) The mounting structure of the liquid level detecting device according to item (1) or (2), wherein each of the hooks has, at a middle position in its length direction, a slant portion that is inclined so as to extend inward in the width direction of the device main body as the position goes toward a tip of the hook.

(4) The mounting structure of the liquid level detecting device according to any one of items (1) to (3), wherein each of the hooks has, at a middle position in its length direction, a removal projection which projects forward in the thickness direction of the device main body.

(5) The mounting structure of the liquid level detecting device according to item (4), wherein the device main body has warp deformation restricting portions which come into contact to the respective removal projections when the respective removal projections are deformed inward in the width direction of the device main body.

In the liquid level detecting device mounting structure having the configuration of item (1), the claws of the hooks of the device main body are locked on the respective projections on the mounting surface from inside in the width direction of the device main body, whereby the device main body is prevented from coming off. As a result, not only the width of the device main body but also the width of the entire mounting object member on which the device main body is mounted can be made smaller than in the structure in which a mounting object member is provided with hooks that are locked on two respective side portions of a device main body from outside. Furthermore, an event that a lock state is canceled unintentionally can be prevented in contrast to the case of the structure that a gap is formed between a mounting surface and a hook portion. As a result, a state that the device main body is attached to the mounting object member can be maintained reliably.

In addition, since the hooks are formed closer to the mounting surface in the thickness direction of the device main body than the holder movable area of the device main body, the hooks can overlap with the holder movable area when viewed from the thickness direction of the device main body. This makes it possible to miniaturize the device main body by minimizing the length of projection of the hooks from the other part of the device main body.

In the liquid level detecting device mounting structure having the configuration of item (2), even if a hook comes into contact with a nearby component or the like and is thereby deformed inward in the thickness direction of the device main body, the hook comes into contact with the associated lateral deformation restriction portion and hence is prevented from being damaged due to excessive deformation. For example, when work of mounting the device main body on the mounting surface is carried out, there may occur an event that the device main body is inserted between the lock portions 53 with the device main body 20 inclined toward the right side or left side. In that event, one of the pair of hooks comes into contact with the associated projection strongly, as a result of which the hook is deformed to a large extent inward in the width direction of the device main body 20. In this case, the hook that has been deformed to a large extent comes into contact with the associated lateral deformation restriction portion and hence is prevented from being deformed excessively. The device main body can thus be mounted on the mounting object member smoothly without necessitating a forcible manipulation.

In the liquid level detecting device mounting structure having the configuration of item (3), the tip portion of each hook in which the claw projects outward can be shifted toward the center line of the device main body in its width direction. As a result, the device main body can be miniaturized further. Since each hook has, at the middle position in its length direction, the slant portion that is inclined so as to go inward in the width direction of the device main body as the position goes toward its tip, the insertion force that is necessary in inserting the pair of hooks between the projections on the mounting surface and having the claws locked on the projections can be weakened to increase the ease of mounting while the hooks are locked on the respective projections on the mounting surface with sufficient strength.

In the liquid level detecting device mounting structure having the configuration of item (4), a worker can easily deform the hooks elastically in the unlocking directions (i.e., inward in the width direction of the device main body) via the removal projections which project forward in the thickness direction of the device main body, and hence can easily remove the device main body from the mounting object member.

In the liquid level detecting device mounting structure having the configuration of item (5), when a worker manipulates the removal projections in the unlocking directions, the removal projections come into contact with the respective warp deformation restricting portions, whereby the removal projections and the hooks are prevented from being damaged due to excessive deformation.

More specifically, when a worker pushes the removal projections excessively in the unlocking directions in doing work of removing the device main body from the mounting object member, bending stress acts on the removal projections and torsional stress acts on base portions of the hooks. At this time, since the removal projections come into contact with the respective warp deformation restricting portions and inward displacement of the removal projections in the width direction of the device main body is restricted so that they do not go beyond prescribed positions, it is possible to prevent the removal projections from receiving excessive bending stress and prevent the hooks from receiving excessive torsional stress. As a result, the removal projections and the hooks can be prevented from being damaged and the device main body can be removed from the mounting object member in an unforced manner, that is, smoothly.

The invention makes it possible to provide a liquid level detecting device mounting structure that allows a main body of the liquid level detecting device to be kept attached to a mounting object member reliably while enabling miniaturization of the liquid level detecting device.

The invention has been described above concisely. The details of the invention will become more apparent when the modes for carrying out the invention (hereinafter referred to as an embodiment) described below are read through with reference to the accompanying drawings.

BRIEF DESCRIPTION OF THE DRAWINGS

FIG. 3A is a perspective view of a device main body, attached to a mounting object member, of the liquid level detecting device, and FIG. 3B is a perspective view of the mounting object member to which the device main body of the liquid level detecting device is to be attached.

FIG. 4A is a front view of the device main body, attached to the mounting object member, of the liquid level detecting device, and FIG. 4B is a front view of the mounting object member to which the device main body of the liquid level detecting device is to be attached.

FIG. 13A is a perspective view of the device main body, attached to a mounting object member, of the liquid level detecting device, and FIG. 13B is a perspective view of the mounting object member to which the device main body of the liquid level detecting device is to be attached.

FIG. 14A is a front view of the device main body, attached to the mounting object member, of the liquid level detecting device, and FIG. 14B is a front view of the mounting object member to which the device main body of the liquid level detecting device is to be attached.

DETAILED DESCRIPTION OF THE EXEMPLARY EMBODIMENTS

Figure 1:
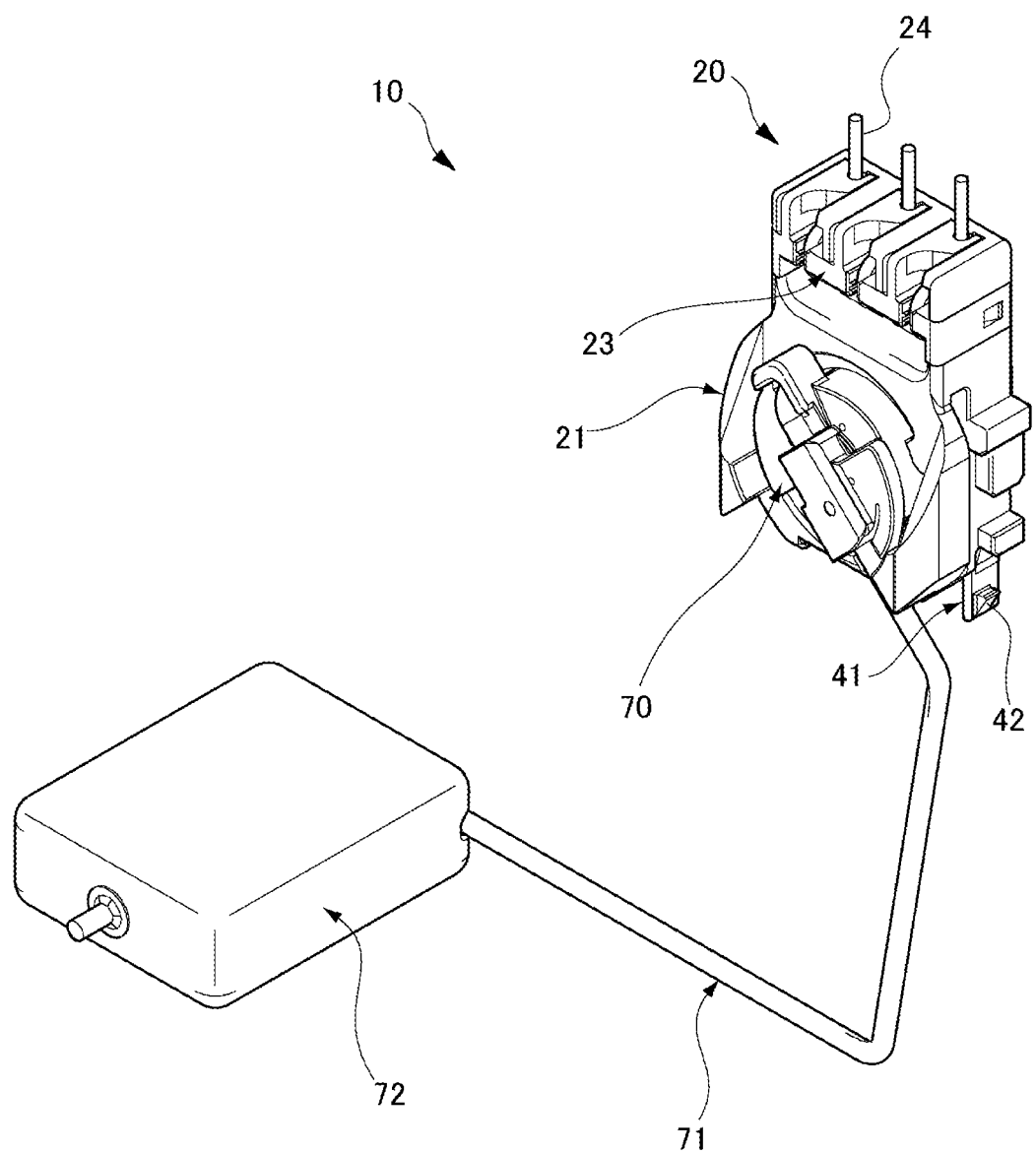
FIG. 1 is a perspective view of a liquid level detecting device.
Figure 2:
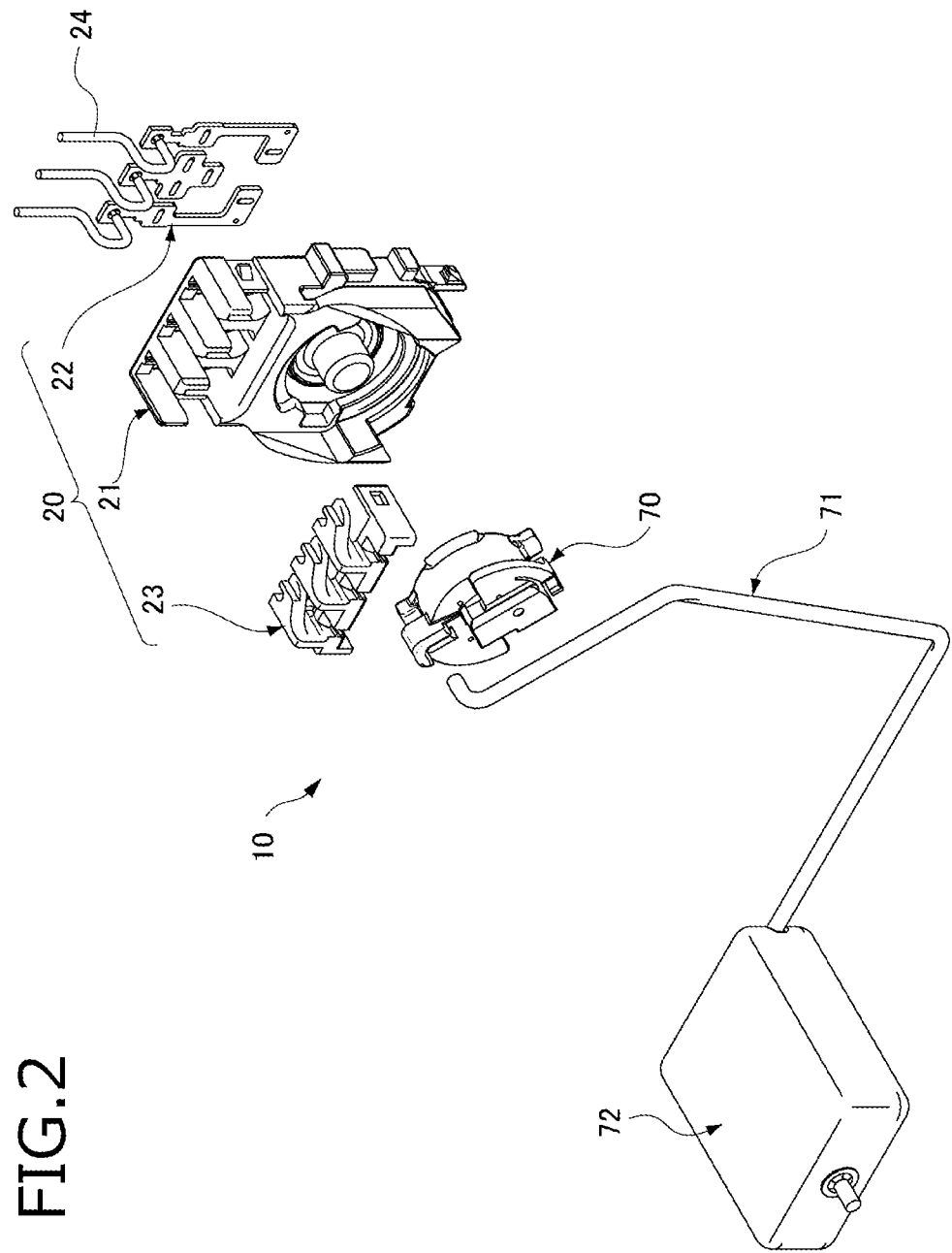
FIG. 2 is an exploded perspective view of the liquid level detecting device shown in FIG. 1.

An embodiment of the present invention will be hereinafter described with reference to the drawings. FIGS. 1 and 2 are a perspective view and an exploded perspective view of a liquid level detecting device 10, respectively.

As shown in FIGS. 1 and 2, the liquid level detecting device 10 includes a device main body 20 and a holder 70. The device main body 20 includes a sensor housing 21, a terminal 22, and a holding member 23. The terminal 22 and the holding member 23 are attached to the sensor housing 21. A lead of a Hall element (not shown) that is provided inside the sensor housing 21 is connected to the terminal 22. Detection wires 24 which are held by the holding member 23 are connected to the terminal 22 and lead out from the top of the sensor housing 21.

The holder 70 which is circular and has a circular-ring-shaped magnet (not shown) inside is attached to a front portion of the sensor housing 21 and held by it rotatably. One end portion of a float arm 71 is connected to the holder 70. A float 72 is fixed to the other end portion, which is a free end portion, of the float arm 71.

The liquid level detecting device 10 is attached to a mounting object member of, for example, a fuel tank that is installed in a vehicle such as an automobile, and detects a liquid level of a fuel stored inside the fuel tank.

In the liquid level detecting device 10, the float arm 71 swings as the float 72 moves following the liquid surface. And the holder 70 to which the float arm 71 is connected rotates with respect to the device main body 20. In response, the Hall element that is provided in the device main body 20 detects a variation of the magnetic flux generated by the magnet that is provided in the holder 70 and a detection result is sent to a measuring unit through the detection wires 24. The measuring unit determines a liquid level on the basis of the detection result received from the Hall element, and issues a warning if necessary. For example, the measuring unit issues a warning of a fuel shortage of the fuel tank.

Figure 3A:
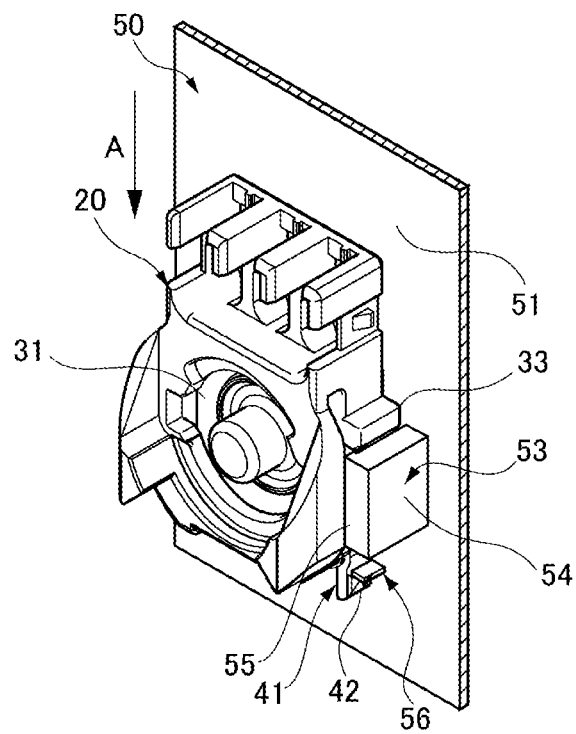
FIGS. 3A and 3B illustrate a liquid level detecting device mounting structure according to an embodiment.
Figure 3B:
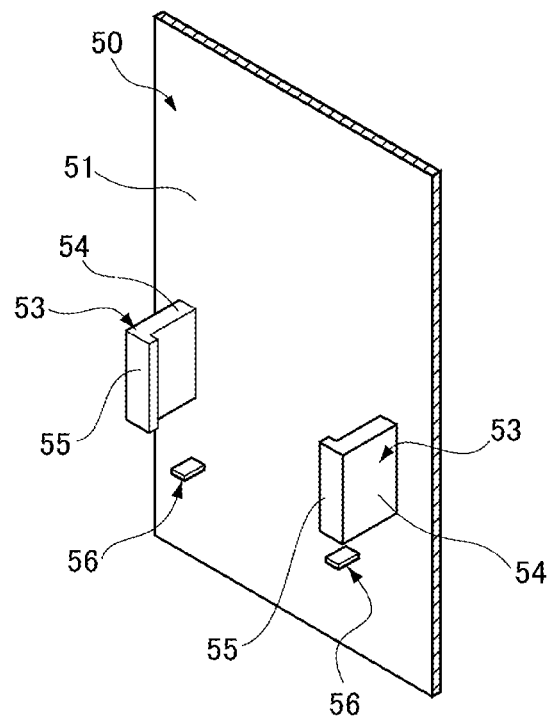
Figure 4A:
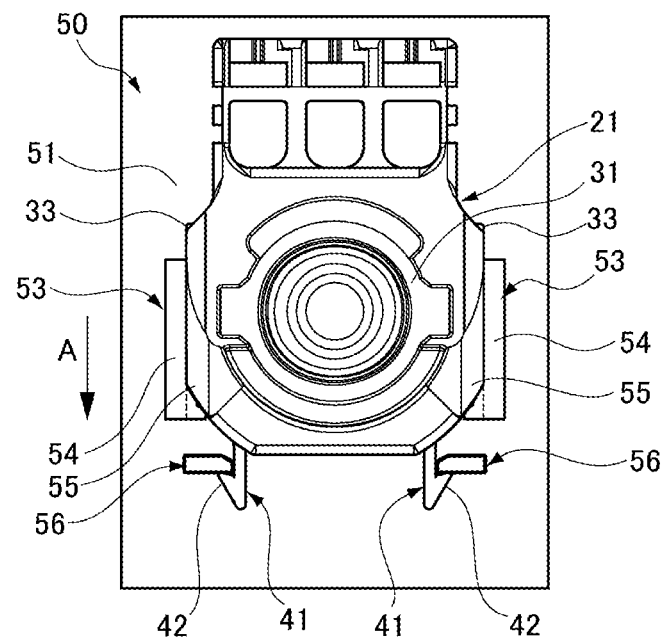
FIGS. 4A and 4B also illustrate the liquid level detecting device mounting structure according to the embodiment.
Figure 4B:
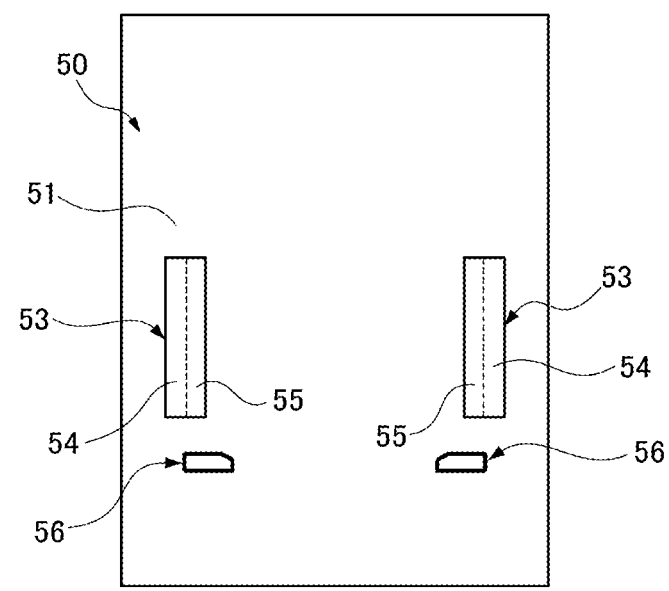

A liquid level detecting device mounting structure according to the embodiment will be described below. FIGS. 3A and 3B illustrate a liquid level detecting device mounting structure according to the embodiment; FIG. 3A is a perspective view of the device main body 20, attached to a mounting object member 50, of the liquid level detecting device 10, and FIG. 3B is a perspective view of the mounting object member 50 to which the device main body 20 of the liquid level detecting device 10 is to be attached. FIGS. 4A and 4B also illustrate the liquid level detecting device mounting structure according to the embodiment; FIG. 4A is a front view of the device main body 20, attached to the mounting object member 50, of the liquid level detecting device 10, and FIG. 4B is a front view of the mounting object member 50 to which the device main body 20 of the liquid level detecting device 10 is to be attached.

As shown in FIGS. 3A and 4A, the device main body 20 of the liquid level detecting device 10 is attached to the mounting object member 50. The mounting object member 50 is made of a resin or a metal and is provided in, for example, a pump assembly of a fuel pump that is attached to a fuel tank. The device main body 20 is mounted on a mounting surface 51 of the mounting object member 50 from above.

As shown in FIGS. 3B and 4B, the mounting surface 51 of the mounting object member 50 has a pair of lock portions 53 and a pair of projections 56, all of which project from the mounting surface 51. The lock portions 53 are spaced from each other in the left-right direction and opposed to each other, and have plate-like walls 54 which are disposed parallel with each other and lock pieces 55 which project from their top edges in such directions as to come closer to each other.

The device main body 20 of the liquid level detecting device 10 is mounted on the mounting object member 50 by inserting the device main body 20 between the lock portions 53 by sliding it in an insertion direction A (i.e., downward). The projections 56 are formed below the respective lock portions 53 (i.e., on the destination side in the insertion direction A). The projections 56 are spaced from each other so that no parts of them exist outside the range defined by the outer surfaces of the lock portions 53.

Figure 5:
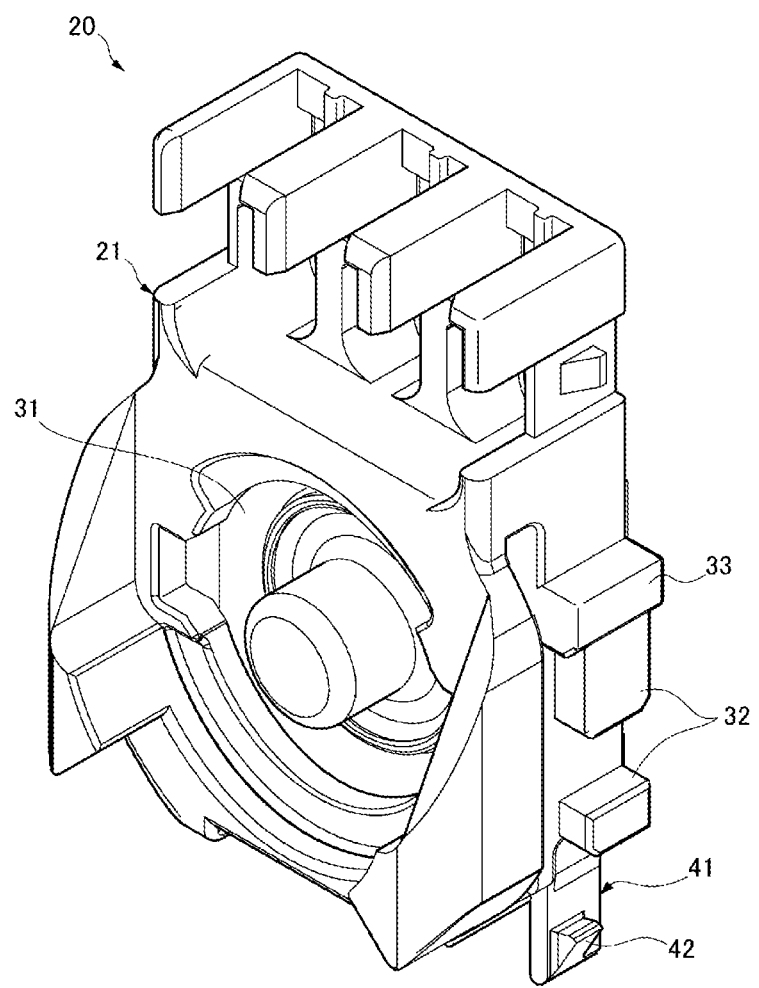
FIG. 5 is a perspective view of the device main body, to be attached to the mounting object member, of the liquid level detecting device.
Figure 6:
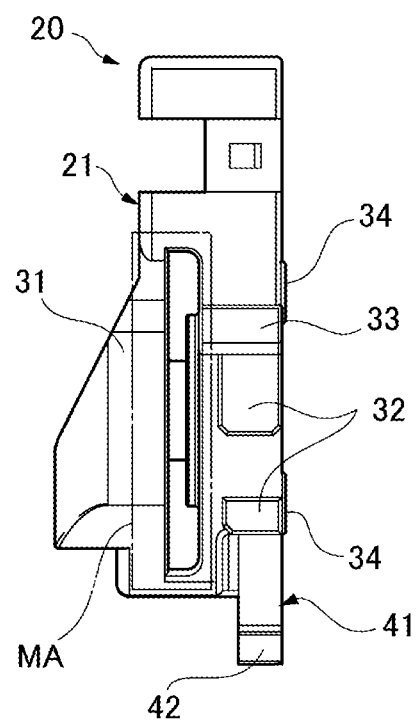
FIG. 6 is a side view of the device main body, to be attached to the mounting object member, of the liquid level detecting device.
Figure 7:
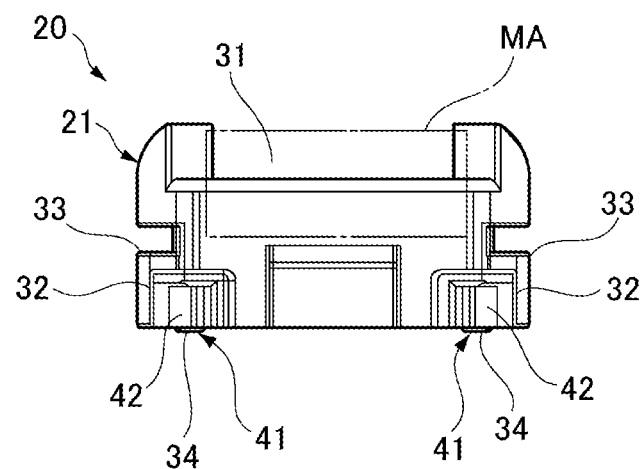
FIG. 7 is a bottom view of the device main body, to be attached to the mounting object member, of the liquid level detecting device.

FIG. 5 is a perspective view of the device main body 20, to be attached to the mounting object member 50, of the liquid level detecting device 10. FIG. 6 is a side view of the device main body 20, to be attached to the mounting object member 50, of the liquid level detecting device 10. FIG. 7 is a bottom view of the device main body 20, to be attached to the mounting object member 50, of the liquid level detecting device 10.

As shown in FIGS. 5-7, the device main body 20 has, on the front side, a holder attachment portion 31 to which the holder 70 is attached. The holder 70 is attached to the holder attachment portion 31 and is held rotatably by the holder attachment portion 31. The holder attachment portion 31 has a movable area MA where the holder 70 being attached to the holder attachment portion 31 can be rotated.

Two sets of lock projections 32 are provided on side portions of the device main body 20. The front-rear length of the lock projections 32 is slightly shorter than the interval between the mounting surface 51 and the lock pieces 55 of the lock portions 53. The distance between the outer surfaces of the sets of lock projections 32 is slightly shorter than the interval between the inner surfaces of the walls 54 of the lock portions 53.

Furthermore, the device main body 20 is formed with stoppers 33 which are larger than the lock projections 32 in horizontal cross section adjacent to the lock projections 32 on the origin side in the insertion direction A. Plural surface contact portions 34 project slightly from the back surface of the device main body 20.

Figure 8:
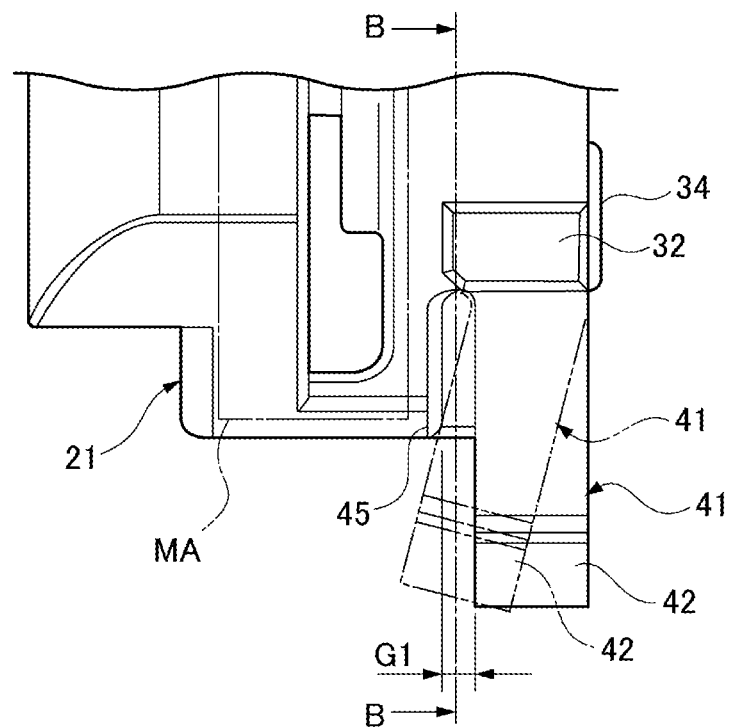
FIG. 8 is a side view of a bottom part of the device main body.
Figure 9:
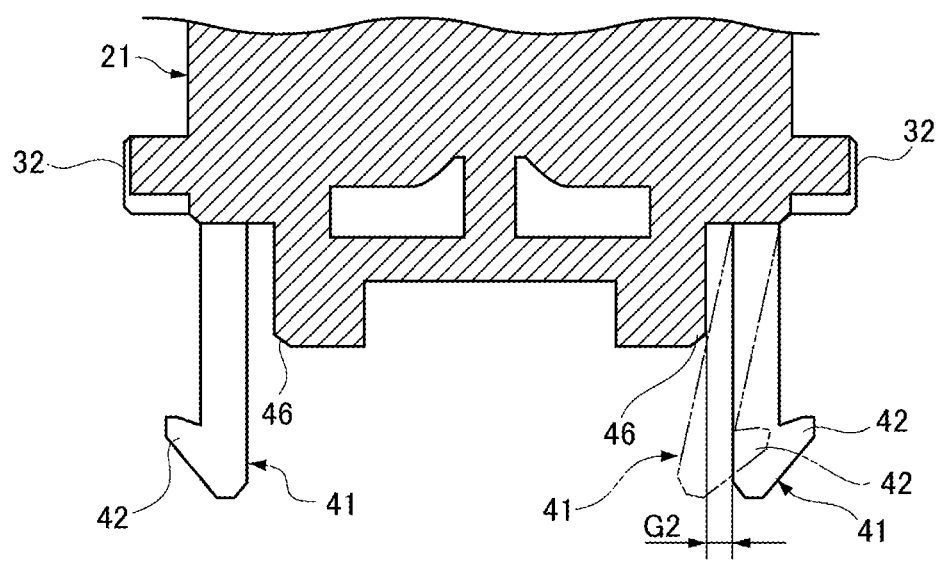
FIG. 9 is a sectional view taken along line B-B in FIG. 8.

FIG. 8 is a side view of a bottom part of the device main body 20. FIG. 9 is a sectional view taken along line B-B in FIG. 8.

As shown in FIGS. 8 and 9, the device main body 20 is formed with a pair of hooks 41 at bottom positions, that is, on the destination side in the insertion direction A in which the device main body 20 is inserted between the lock portions 53. The hooks 41 are spaced from each other and extend downward. Claws 42 project outward from the tips of the hooks 41, respectively. The distance between the tips of the claws 42 is longer than the interval between the projections 56 of the mounting object member 50. The hooks 41 are formed on the back surface side, that is, formed closer to the mounting surface 51 than the movable area MA of the device main body 20. Base portions and their neighborhoods of the hooks 41 coexist with part of the movable area MA; that is, the hooks 41 overlap with the movable area MA when viewed from the thickness direction of the device main body 20.

The device main body 20 has contact portions 45 in front of the respective hooks 41, that is, on the destination side in the thickness direction of the device main body 20. A gap G1 exists between the contact portions 45 and the hooks 41. A hook 41 comes into contact with the associated contact portion 45 when deformed elastically unintentionally toward the front side in the thickness direction of the device main body 20 (indicated by a two-dot chain line in FIG. 8). This suppresses elastic deformation of the hooks 41 toward the front side in the thickness direction of the device main body 20.

The device main body 20 also has lateral deformation restriction portions 46 inside the hooks 41 in the width direction of the device main body 20, respectively. A gap G2 exists between the lateral deformation restriction portions 46 and the hooks 41. A hook 41 comes into contact with the associated lateral deformation restriction portion 46 when deformed elastically inward in the width direction of the device main body 20 (indicated by a two-dot chain line in FIG. 9). This prevents the hooks 41 from being deformed inward in the width direction of the device main body 20 beyond a prescribed degree.

To mount the device main body 20 of the liquid level detecting device 10 on the mounting object member 50, the device main body 20 is oriented so that the hooks 41 are located at the bottom and the back surface of the device main body 20 is opposed to the mounting surface 51 of the mounting object member 50 and the device main body 20 is brought close to the mounting object member 50 from above. Then the device main body 20 is inserted between the lock portions 53 while the back surface of the device main body 20 is kept parallel with the mounting surface 51 and the two sets of lock projections 32 which are the side portions of the device main body 20 are placed between the mounting surface 51 and the lock pieces 55 of the lock portions 53.

Subsequently, the device main body 20 is pushed down further. As a result, the claws 42 of the hooks 41 come into contact with the respective projections 56 of the mounting object member 50 and are deformed elastically inward in the width direction of the device main body 20. Then the device main body 20 is pushed down even further until the stoppers 33 (located over the lock projections 32) come into contact with the respective lock portions 53, whereby the claws 42 of the hooks 41 go over the projections 56, respectively. Under the projections 56, the hooks 41 that have been deformed elastically recover outward in the width direction of the device main body 20 and the claws 42 are locked on the respective projections 56.

As a result, a state is established that the two sets of lock projections 32 which are the two sets of side portions of the device main body 20 are locked on the respective lock portions 53 of the mounting object member 50 and the claws of the hooks 41 of the device main body 20 are locked on the respective projections 56 (the hooks do not come off the projections 56), whereby the device main body 20 is mounted on the mounting object member 50 reliably. In the state that the device main body 20 is mounted on the mounting object member 50, the plural surface contact portions 34 which are formed on the back surface of the device main body 20 are in contact with the mounting surface 51. As a result, the device main body 20 is fixed to the mounting object member 50 stably without play.

Incidentally, when work of mounting the device main body 20 on the mounting object member 50 is carried out in the above-described manner, there may occur an event that the device main body 20 is inserted between the lock portions 53 of the mounting object member 50 with the device main body 20 inclined forward. In that event, the tips of the hooks 41 which project to the destination side in the insertion direction A may come into contact with the mounting surface 51 of the mounting object member 50, as a result of which the hooks 41 are deformed elastically unintentionally toward the front side in the thickness direction of the device main body 20. In this case, the elastically deformed hooks 41 come into contact with the contact portion 45 and hence are prevented from being deformed further (see FIG. 8).

Another kind of event may occur that the device main body 20 is inserted between the lock portions 53 with the device main body 20 inclined toward the right side or left side from the insertion direction A. In that event, one of the pair of hooks 41 comes into contact with the associated projection 56 strongly, as a result of which the hook 41 is deformed to a large extent inward in the width direction of the device main body 20. In this case, the hook 41 that has been deformed elastically to a large extent comes into contact with the associated lateral deformation restriction portion 46 of the device main body 20 and hence is prevented from being deformed excessively (see FIG. 9).

As described above, in the liquid level detecting device mounting structure according to the embodiment, the claws 42 of the hooks 41 of the device main body 20 are locked on the respective projections 56 on the mounting surface 51 from inside in the width direction of the device main body 20, whereby the device main body 20 is prevented from coming off. As a result, not only the width of the device main body 20 but also the width of the entire mounting object member 50 on which the device main body 20 is mounted can be made smaller than in the structure in which a mounting object member is provided with hooks that are locked on two respective side portions of a device main body from outside. Furthermore, an event that a lock state is canceled unintentionally can be prevented in contrast to the case of the structure that a gap is formed between a mounting surface and a hook portion. As a result, a state that the device main body 20 is attached to the mounting object member 50 can be maintained reliably.

In addition, since the hooks 41 are formed closer to the mounting surface 51 in the thickness direction of the device main body 20 than the holder movable area MA of the device main body 20 is, the hooks 41 can overlap with the movable area MA of the holder 70 when viewed from the thickness direction of the device main body 20. This makes it possible to miniaturize the device main body 20 by minimizing the length of projection of the hooks 41 from the other part of the device main body 20.

Furthermore, the device main body 20 has the contact portions 45 with which the hooks 41 are to come into contact when deformed toward the front side in the thickness direction of the device main body 20. As a result, even if a hook 41 comes into contact with a nearby component or the like and is thereby deformed unintentionally toward the front side in the thickness direction of the device main body 20, the hook 41 comes into contact with the associated contact portion 45 and hence is prevented from being damaged due to excessive deformation. For example, even if the device main body 20 is inserted between the lock portions 53 with the device main body 20 inclined forward or rearward and the tips of the hooks 41 thereby come into contact with the mounting surface 51 and are deformed unintentionally toward the front side in the thickness direction of the device main body 20, the hooks 41 come into contact with the contact portions 45 and hence are prevented from being deformed further. In this manner, the hooks 41 are prevented from being deformed excessively and thereby damaged. The device main body 20 can thus be mounted on the mounting object member 50 smoothly without necessitating a forcible manipulation.

Still further, the device main body 20 has the lateral deformation restriction portions 46 with which the hooks 41 are to come into contact when deformed inward in the width direction of the device main body 20. As a result, even if a hook 41 comes into contact with a nearby component or the like and is thereby deformed inward in the thickness direction of the device main body 20, the hook 41 comes into contact with the associated lateral deformation restriction portion 46 and hence is prevented from being damaged due to excessive deformation. For example, even if the device main body 20 is inserted between the lock portions 53 with the device main body 20 inclined toward the right side or left side and one of the pair of hooks 41 comes into contact with the associated projection 56 and is deformed to a large extent inward in the width direction of the device main body 20, the hook 41 comes into contact with the associated lateral deformation restriction portion 46 and hence is prevented from being deformed excessively. In this manner, the hook 41 is prevented from being deformed excessively and thereby damaged. The device main body 20 can thus be mounted on the mounting object member 50 smoothly without necessitating a forcible manipulation.

The invention is not limited to the above embodiment and various modifications, improvements, etc. can be made as appropriate. The materials, shapes, sets of dimensions, numbers, locations, etc. of the respective constituent elements of the above embodiment are not limited to those disclosed but can be determined in desired manners as long as the invention can be implemented.

Figure 10:
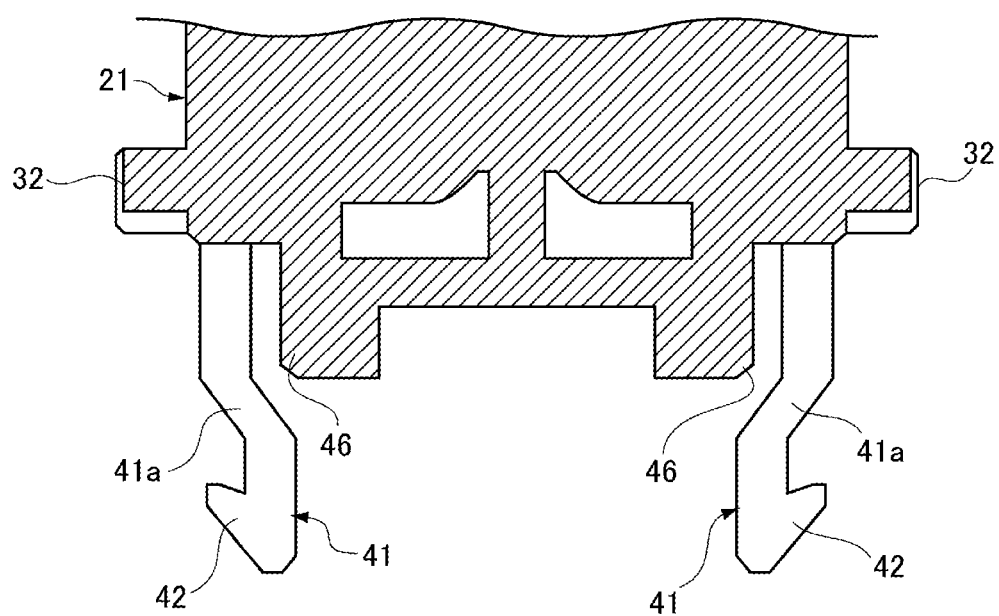
FIG. 10 is a is a sectional view taken along line B-B in FIG. 8 and shows hooks having another shape.

For example, as shown in FIG. 10, each of the hooks 41 of the device main body 20 may be modified so as to have, at a middle position in its length direction, a slant portion 41a that is inclined so as to the center line of the device main body 20 in its width direction as the position goes toward its tip, whereby a tip portion of each hook 41 is shifted inward.

With these modified hooks 41, the tip portion of each hook 41 in which the claw 42 projects outward can be shifted toward the center line of the device main body 20 in its width direction. As a result, the device main body 20 can be miniaturized further. Since each hook 41 has, at the middle position in its length direction, the slant portion 41a that is inclined so as to go inward in the width direction of the device main body 20 as the position goes toward its tip, the insertion force that is necessary in inserting the pair of hooks 41 between the projections 56 on the mounting surface 51 and having the claws 42 locked on the projections 56 can be weakened to increase the ease of mounting while the hooks 41 are locked on the respective projections 56 on the mounting surface 51 with sufficient strength.

Figure 11:
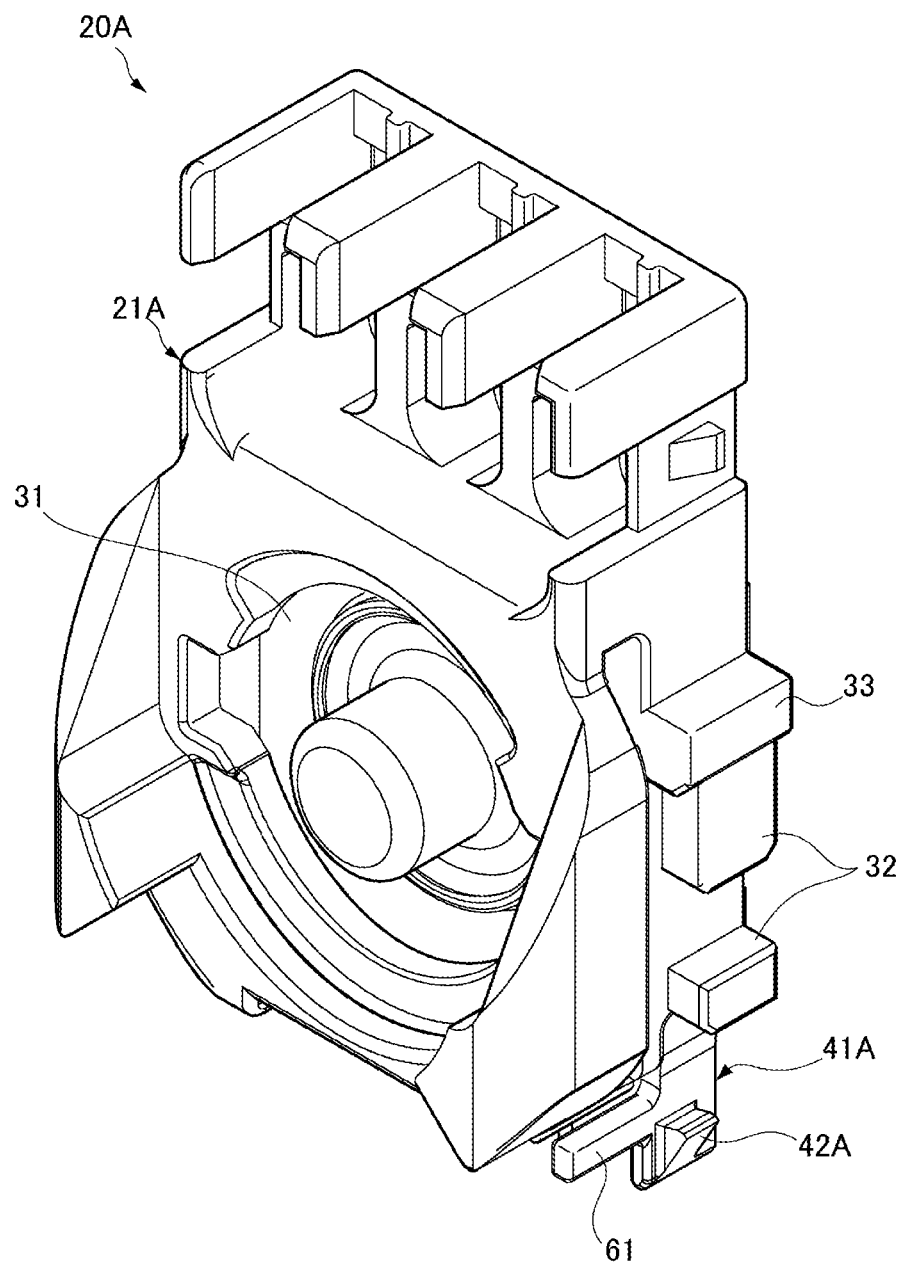
FIG. 11 is a perspective view of a device main body of a liquid level detecting device according to the other embodiment.
Figure 12:
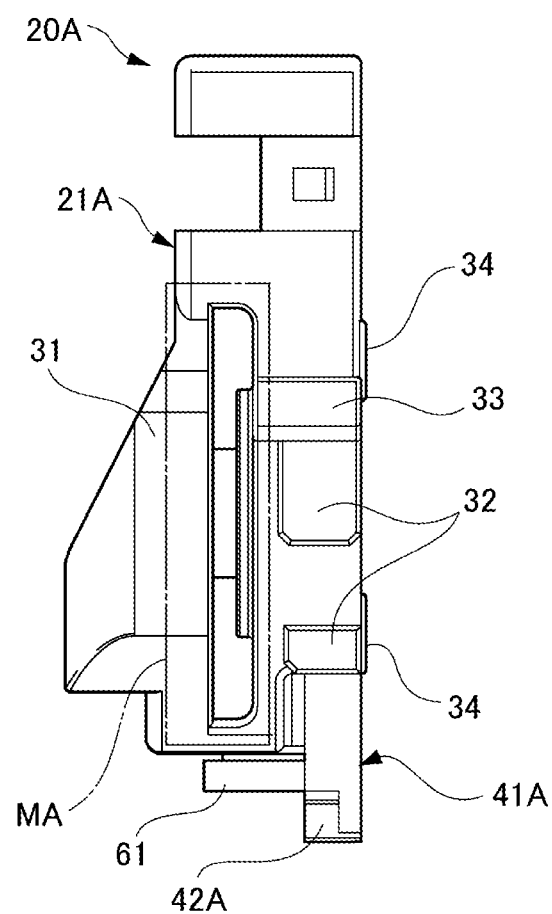
FIG. 12 is a side view of the device main body shown in FIG. 11.
Figure 13A:
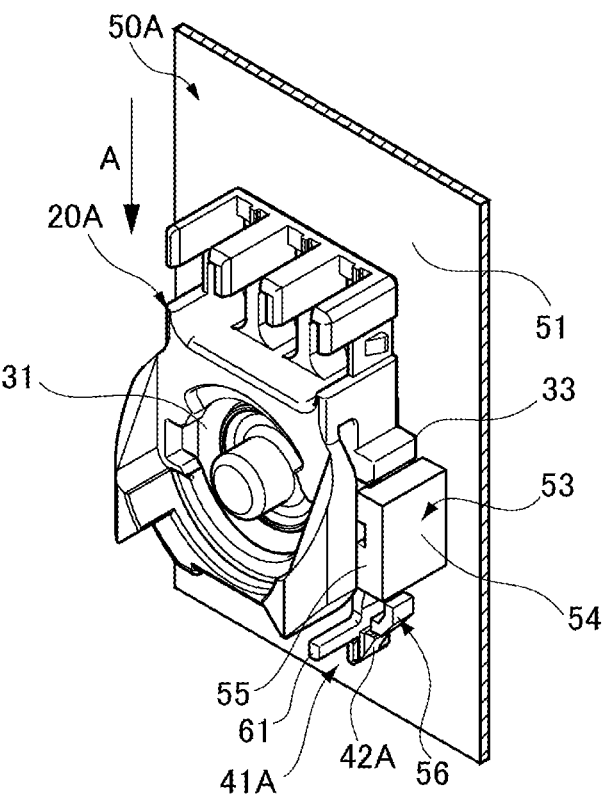
FIGS. 13A and 13B illustrate a liquid level detecting device mounting structure according to the other embodiment.
Figure 13B:
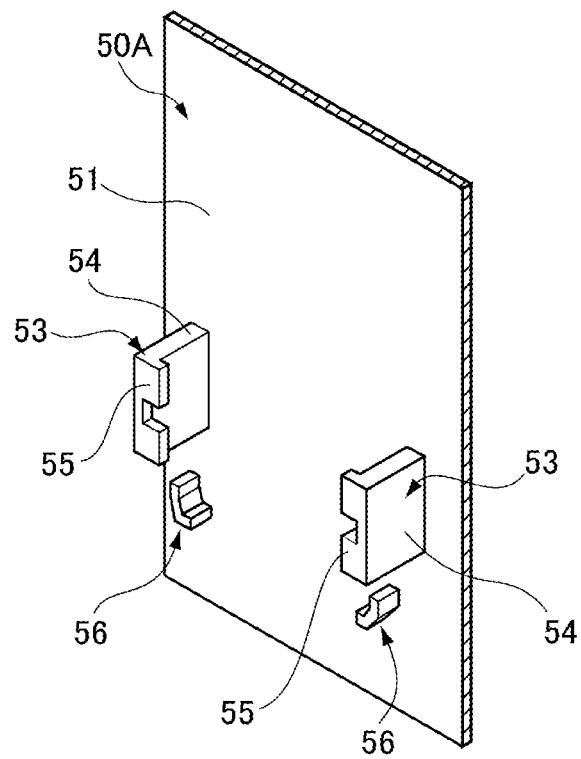
Figure 14A:
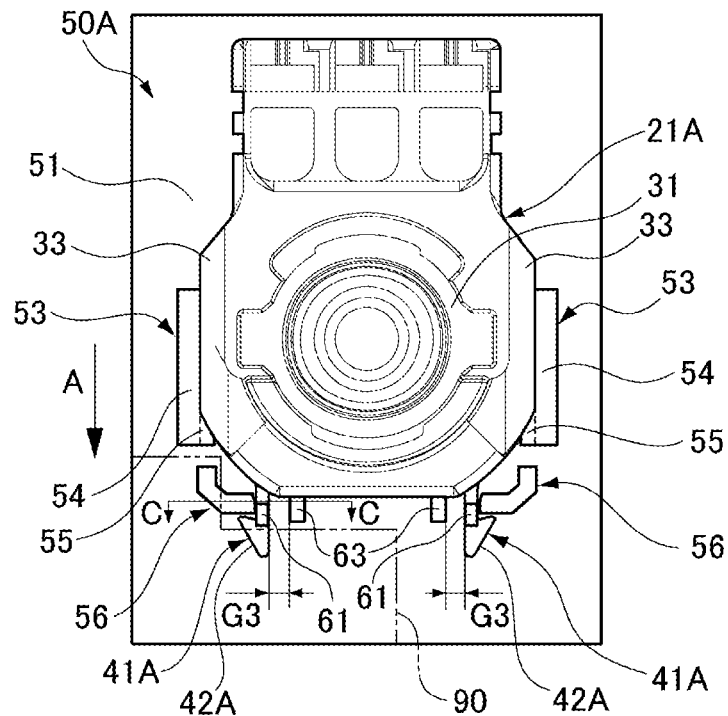
FIGS. 14A and 14B also illustrate the liquid level detecting device mounting structure according to the other embodiment.
Figure 14B:
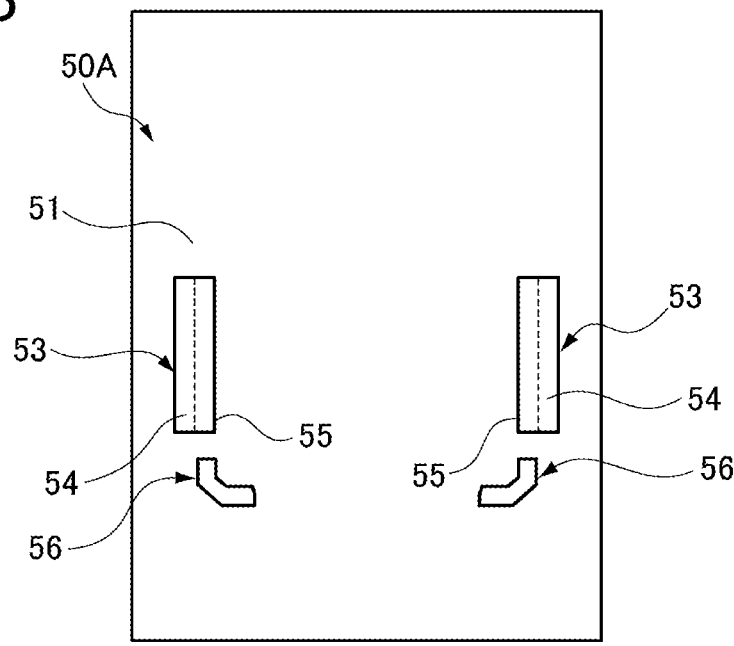

FIGS. 11 and 12 are a perspective view and a side view, respectively, of a device main body 20A of a liquid level detecting device according to the other embodiment. FIGS. 13A and 13B illustrate a liquid level detecting device mounting structure according to the other embodiment; FIG. 13A is a perspective view of the device main body 20A, attached to a mounting object member 50A, of the liquid level detecting device, and FIG. 13B is a perspective view of the mounting object member 50A to which the device main body 20A of the liquid level detecting device is to be attached. FIGS. 14A and 14B also illustrate the liquid level detecting device mounting structure according to the other embodiment; FIG. 14A is a front view of the device main body 20A, attached to the mounting object member 50A, of the liquid level detecting device, and FIG. 14B is a front view of the mounting object member 50A to which the device main body 20A of the liquid level detecting device is to be attached.

As shown in FIG. 11 to FIGS. 14A and 14B, the device main body 20A according to the other embodiment is the same in configuration as the above-described device main body 20 except for a pair of hooks 41A and warp deformation restricting portions 63. Thus, constituent members of the device main body 20A having the same ones in the device main body 20 will be given the same reference symbols as the latter and will not be described in detail.

As shown in FIGS. 14A and 14B, a sensor housing 21A of the device main body 20A is formed with the pair of hooks 41A at bottom positions, that is, on the destination side in the insertion direction A in which the device main body 20A is inserted between the lock portions 53. The hooks 41A are spaced from each other and extend downward. Removal projections 61 project forward in the thickness direction of the sensor housing 21A at halfway positions in the length direction of the hooks 41A.

The device main body 20A has the warp deformation restricting portions 63 inside the respective removal projections 61 in the width direction of the sensor housing 21A with gaps G3 formed in between. When deformed elastically being pushed inward in the width direction, the removal projections 61 come into contact with the respective deformation restricting portions 63 (indicated by a two-dot chain line in FIG. 15). As a result, the inward displacement of the removal projections 61 in the width direction is restricted so that they do not go beyond prescribed positions.

To mount the device main body 20A on the mounting object member 50A, the device main body 20A is oriented so that the hooks 41A are located at the bottom and the back surface of the device main body 20A is opposed to the mounting surface 51 of the mounting object member 50A and the device main body 20A is brought close to the mounting object member 50A from above. Then the device main body 20A is inserted between the lock portions 53 while the back surface of the device main body 20A is kept parallel with the mounting surface 51 and the two sets of lock projections 32 which are the side portions of the device main body 20A are placed between the mounting surface 51 and the lock pieces 55 of the lock portions 53.

Subsequently, the device main body 20A is pushed down further, whereby as shown in FIGS. 13A and 14A a state is established that claws 42A of the hooks 41A are locked on respective projections 56. As a result, in the same manner as in the case of the above-described device main body 20, the device main body 20A is fixed to the mounting object member 50A stably without play.

To remove the device main body 20A from the mounting object member 50A, the hooks 41A are deformed elastically in the unlocking directions (i.e., inward in the width direction of the device main body 20A) via the removal projections 61 which project forward in the thickness direction of the sensor housing 21A. A worker can unlock the hooks 41A merely by pinching the pair of removal projections 61 with one hand.

Figure 15:
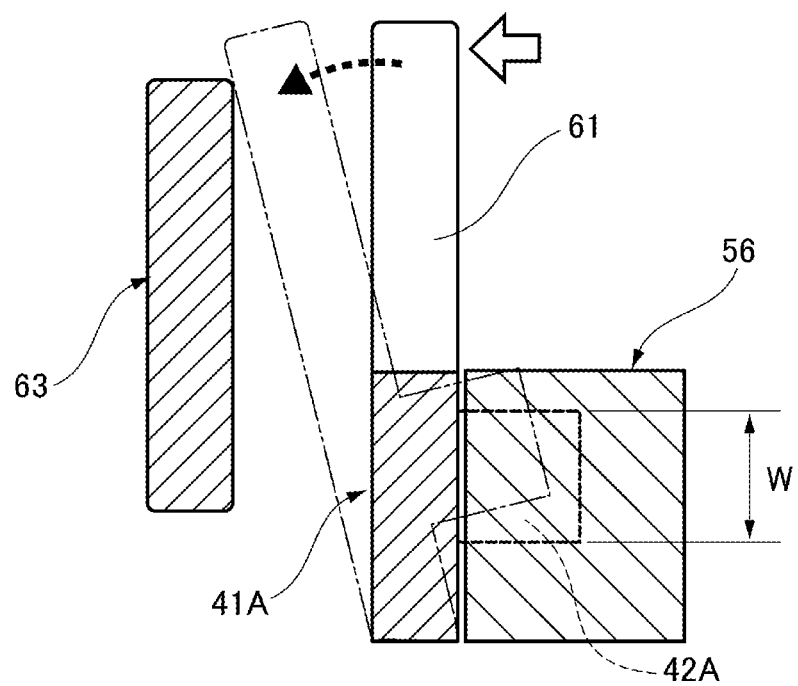
FIG. 15 is a sectional view taken along line C-C in FIG. 14A.

More specifically, as shown in FIG. 15, when the removal projections 61 are pushed inward in the width direction of the device main body 20A, base portions of the hooks 41A are twisted and the claws 42A are displaced in such directions as to be go away from the respective projections 56, whereby the claws 42A are unlocked from the projections 56. Since the width W over which each claw 42A is locked on the associated projection 56 is shorter than that of each claw 42 of the above-described device main body 20, the claws 42A are disengaged from the respective projections 56 more easily when the removal projections 61 are pushed in the unlocking directions. Thus, the hooks 41A can be disengaged from the respective projections 56 easily.

The device main body 20A can be removed from the mounting object member 50A easily by pinching the pair of removal projections 61 with one hand and lifting up the device main body 20A by holding it with the other hand.

As indicated by a two-dot chain line in FIG. 14A, there may occur a case that a worker cannot touch a hook 41A directly because another constituent member 90 is located in the vicinity of the associated projection 56 of the mounting object member 50A. Even in such a case, the worker can easily pinch the removal projections 61 easily because the removal projections 61 project forward in the thickness direction of the sensor housing 21A. Thus, the hooks 41A can easily be deformed elastically in the unlocking directions via the removal projections 61 and hence the device main body 20A can be removed from the mounting object member 50A.

FIG. 15 is a sectional view taken along line C-C in FIG. 14A. The device main body 20A has the warp deformation restricting portions 63 to which the respective removal projections 61 are to come into contact in being deformed inward in the width direction. Thus, as shown in FIG. 15, when a worker manipulates the removal projections 61 in the unlocking directions, the removal projections 61 come into contact with the respective warp deformation restricting portions 63, whereby the removal projections 61 and the hooks 41A are prevented from being damaged due to excessive deformation.

More specifically, when a worker pushes the removal projections 61 excessively in the unlocking directions in doing work of removing the device main body 20A from the mounting object member 50A, bending stress acts on the removal projections 61 and torsional stress acts on base portions of the hooks 41A. At this time, since the removal projections 61 come into contact with the respective warp deformation restricting portions 63 and inward displacement of the removal projections 61 in the width direction of the device main body 20A is restricted so that they do not go beyond the prescribed positions, it is possible to prevent the removal projections 61 from receiving excessive bending stress and prevent the hooks 41A from receiving excessive torsional stress. As a result, the removal projections 61 and the hooks 41A can be prevented from being damaged and the device main body 20A can be removed from the mounting object member 50A in an unforced manner, that is, smoothly.

As described above, the mounting object member 50A employed in the other embodiment can provide, in addition to the advantages provided by the above-described device main body 20, an advantage that a worker can easily deform the hooks 41A elastically in the unlocking directions via the removal projections 61 and hence can easily remove the device main body 20A from the mounting object member 50A.

Furthermore, when a worker manipulates the removal projections 61 in the unlocking directions, the removal projections 61 come into contact with the respective warp deformation restricting portions 63, whereby the removal projections 61 and the hooks 41A are prevented from being damaged due to excessive deformation.

As such, the device main body 20A employed in the other embodiment can be removed from the device main body 20A easily and its hooks 41A are given high durability.

Features of the above-described liquid level detecting device mounting structure according to the embodiment of the invention will be summarized concisely below in the forms of items [1] to [5]:

[1] A mounting structure of a liquid level detecting device (10) for detecting a liquid level of liquid stored in a tank, the mounting structure including:
- a mounting object member (50, 50A); and
- the liquid level detecting device (10) including:
  - a device main body (20, 20A) which is mounted on a mounting surface (51) of the mounting object member (50, 50A); and
  - a holder (70) which is attached to the device main body and is rotated according to a variation of the liquid level of the liquid stored in the tank,
- wherein the mounting objection member (50, 50A) has a pair of lock portions (53) which lock respective side portions of the device main body (20, 20A) when the device main body (20, 20A) is inserted between the lock portions (53) and a pair of projections (56) which are formed so as to face a front portion of the device main body (20, 20A) when the device main body (20, 20A) is inserted between the lock portions (53);
- wherein the device main body (20, 20A) has a pair of hooks (41, 41A) which are arranged in a width direction of the device main body (20, 20A) and extend in an insertion direction (A) where the device main body (20, 20A) is inserted between the lock portions (53);
- wherein the hooks (41, 41A) have respective claws (42, 42A) which are locked on the respective projections (56) from inside in the width direction of the device main body (20, 20A); and
- wherein the hooks (41, 41A) are formed closer to the mounting surface (51) in a thickness direction of the device main body (20, 20A) than a holder movable area (MA) of the device main body (20, 20A).

[2] The mounting structure of the liquid level detecting device (10) according to item [1], wherein the hooks (41, 41A) are formed between the mounting surface (51) and the holder movable area of the device main body (20, 20A) in the thickness direction of the device main body (20, 20A); and
wherein the thickness direction is perpendicular to both of the width direction of the device main body (20, 20A) and the insertion direction.

[3] The mounting structure of the liquid level detecting device (10) according to item [1] or [2], wherein the device main body (20, 20A) has lateral deformation restriction portions (46) which come into contact with the respective hooks (41, 41A) when the hooks (41, 41A) are deformed inward in the width direction of the device main body (20, 20A).

[4] The mounting structure of the liquid level detecting device (10) according to any one of items [1] to [3], wherein each of the hooks (41) has, at a middle position in its length direction, a slant portion (41a) that is inclined so as to extend inward in the width direction of the device main body (20) as the position goes toward a tip of the hook (41).

[5] The mounting structure of the liquid level detecting device according to any one of items [1] to [4], wherein each of the hooks (41A) has, at a middle position in its length direction, a removal projection (61) which projects forward in the thickness direction of the device main body (20A).

[6] The mounting structure of the liquid level detecting device according to item [5], wherein the device main body (20A) has warp deformation restricting portions (63) which come into contact to the respective removal projections (61) when the respective removal projections (61) are deformed inward in the width direction of the device main body (20A).

What is claimed is:

1. A mounting structure of a liquid level detecting device for detecting a liquid level of liquid stored in a tank, the mounting structure comprising:
    a mounting object member; and
    the liquid level detecting device including:
        a device main body which is mounted on a mounting surface of the mounting object member; and
        a holder which is attached to the device main body and is rotated according to a variation of the liquid level of the liquid stored in the tank;
    wherein the mounting object member has a pair of lock portions which lock respective side portions of the device main body when the device main body is inserted between the lock portions and a pair of projections which are formed so as to face a front portion of the device main body when the device main body is inserted between the lock portions;
    wherein the device main body has a pair of hooks which are arranged in a width direction of the device main body and extend in an insertion direction where the device main body is inserted between the lock portions;
    wherein the hooks have respective claws which are locked on the respective projections from inside in the width direction of the device main body; and
    wherein the hooks are formed closer to the mounting surface in a thickness direction of the device main body than a holder movable area of the device main body.

2. The mounting structure according to claim 1, wherein the hooks are formed between the mounting surface and the holder movable area of the device main body in the thickness direction of the device main body; and
    wherein the thickness direction is perpendicular to both of the width direction of the device main body and the insertion direction.

3. The mounting structure according to claim 1, wherein the device main body has lateral deformation restriction portions which come into contact with the respective hooks when the hooks are deformed inward in the width direction of the device main body.

4. The mounting structure according to claim 1, wherein each of the hooks has, at a middle position in its length direction, a slant portion that is inclined so as to extend inward in the width direction of the device main body as the position goes toward a tip of the hook.

5. The mounting structure according to claim 1, wherein each of the hooks has, at a middle position in its length direction, a removal projection which projects forward in the thickness direction of the device main body.

6. The mounting structure according to claim 5, wherein the device main body has warp deformation restricting portions which come into contact to the respective removal projections when the respective removal projections are deformed inward in the width direction of the device main body.

* * * * *